(12) United States Patent
Kim

(10) Patent No.: US 12,287,979 B2
(45) Date of Patent: Apr. 29, 2025

(54) DATA STORAGE APPARATUS AND OPERATING METHOD THEREOF

(71) Applicant: SK hynix Inc., Gyeonggi-do (KR)

(72) Inventor: Jin Pyo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/390,533

(22) Filed: Dec. 20, 2023

(65) Prior Publication Data

US 2025/0044967 A1 Feb. 6, 2025

(30) Foreign Application Priority Data

Jul. 31, 2023 (KR) ........................ 10-2023-0099792

(51) Int. Cl.
*G06F 3/06* (2006.01)

(52) U.S. Cl.
CPC ............ *G06F 3/064* (2013.01); *G06F 3/0625* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 11,416,058 B2 | 8/2022 | Yang et al. | |
| 2011/0060967 A1* | 3/2011 | Warren | G06F 11/1048 711/171 |
| 2011/0060968 A1* | 3/2011 | Warren | G06F 11/1068 714/E11.034 |
| 2014/0208004 A1* | 7/2014 | Cohen | G06F 12/0246 711/103 |
| 2015/0161032 A1* | 6/2015 | Sugino | G06F 11/0787 711/171 |
| 2016/0011813 A1* | 1/2016 | Ellis | G06F 11/1048 714/763 |
| 2016/0018998 A1* | 1/2016 | Mohan | G06F 3/0616 711/103 |
| 2016/0019160 A1* | 1/2016 | Mohan | G06F 12/0246 711/208 |
| 2017/0060445 A1* | 3/2017 | Yang | G06F 3/0679 |
| 2021/0318801 A1* | 10/2021 | Benisty | G06F 3/0604 |
| 2021/0382643 A1* | 12/2021 | Muthiah | G06F 3/0616 |
| 2022/0291837 A1* | 9/2022 | Shao | G06F 3/064 |

FOREIGN PATENT DOCUMENTS

| | | |
|---|---|---|
| EP | 3849108 A1 * | 7/2021 |
| KR | 101506675 B1 | 3/2015 |
| KR | 20210056625 A | 5/2021 |

\* cited by examiner

*Primary Examiner* — Kevin Verbrugge
(74) *Attorney, Agent, or Firm* — IP & T GROUP LLP

(57) ABSTRACT

A data storage apparatus includes a nonvolatile memory device including a dump region configured to temporarily store data according to a state of applied power; and a controller configured to monitor health information of the dump region of the nonvolatile memory device, generate environmental information corresponding to a power loss protection (PLP) operation based on the health information, and share the environmental information with an external device.

20 Claims, 6 Drawing Sheets

DATA STORAGE APPARATUS AND OPERATING METHOD THEREOF

CROSS-REFERENCES TO RELATED APPLICATION

The present application claims priority under 35 U.S.C. § 119(a) to Korean Patent Application Number 10-2023-0099792, filed on Jul. 31, 2023, which is incorporated herein by reference in its entirety.

BACKGROUND

1. Technical Field

Various embodiments of the present disclosure may generally relate to a semiconductor integrated apparatus, and more particularly, to a data storage apparatus and an operating method thereof.

2. Related Art

Data storage apparatuses may be coupled to external devices and perform data input and output operations on storage media according to requests of the external devices.

The data storage apparatuses may include power supply circuits configured to receive power through the external devices and supply the power to internal circuits of the data storage apparatuses.

Unexpected interrupts, for example, sudden power loss (SPL) or sudden power off (SPO) may occur in the power supply circuit. In SPL, user data which are processing or being stored may be lost or corrupted, and thus reliability of electronic apparatuses may not be guaranteed.

Accordingly, a data loss protection (PLP) operation may be performed in SPL. The PLP operation may be, for example, an operation which changes a power supply source from the power supply circuit to an auxiliary power supplier, which is provided separately from the power supply circuit, and stores the data which are processing during the SPL.

SUMMARY

Embodiments of the present disclosure are provided for a data storage apparatus capable of preventing data loss due to sudden power loss (SPL), and an operating method thereof.

In an embodiment of the present disclosure, a data storage apparatus may include a nonvolatile memory device including a dump region configured to temporarily store data in response to a state of applied power; and a controller configured to monitor health information of the dump region of the nonvolatile memory device, generate environmental information corresponding to a power loss protection (PLP) operation based on the health information, and share the environmental information with an external device.

In an embodiment of the present disclosure, an operating method of a data storage apparatus which includes a nonvolatile memory device and a controller, the method may include the controller temporarily storing write-requested data in a buffer memory device in response to a write request of an external device; the controller, when sudden power loss (SPL) is detected during processing of the write request, flushing data of the buffer memory device to a dump region of the nonvolatile memory device; the controller monitoring health information of the dump region of the nonvolatile memory device; the controller generating environmental information corresponding to a power loss protection (PLP) operation based on the health information; and the controller sharing the generated environmental information with the external device.

In an embodiment of the present disclosure, the environmental information is shared according to a request of the external device.

In an embodiment of the present disclosure, the environmental information is shared through an asynchronous event response (AER) command.

In an embodiment of the present disclosure, the method further comprises receiving, by the controller, a control signal including at least one buffering mode among a normal mode, a write through mode, and a read only mode, and wherein the control signal is transmitted from the external device as a response to the sharing.

In an embodiment of the present disclosure, the normal mode is a mode in which the controller flushes the temporarily stored data from the buffer memory device to the dump region and transmits a flush completion signal to the external device, wherein the write through mode is a mode in which the controller programs the write-requested data in the nonvolatile memory device and transmits a write completion signal to the external device, and wherein the read only mode is a mode in which the external device is only allowed to read data from the data storage apparatus.

In an embodiment of the present disclosure, the environmental information includes information on a performance amount of the PLP operation when the dump available amount per unit time is greater than or equal to the first threshold value and less than a second threshold value.

In an embodiment of the present disclosure, the temporarily storing includes restricting, up to the performance amount, an amount of the write-requested data in the buffer memory device.

In an embodiment of the present disclosure, a storage system may include a data storage apparatus; and a processing apparatus coupled to the data storage apparatus through an interface apparatus and configured to control the data storage apparatus to store data. The processing apparatus may be configured to set control environmental information of the data storage apparatus to protect the data, request environmental information corresponding to a power loss protection (PLP) operation of the data storage apparatus from the data storage apparatus, and correct the control environmental information based on the environmental information received from the data storage apparatus.

According to the present technology, the execution and range of a power loss protection (PLP) operation may be determined according to a state of a dump region of a nonvolatile memory device in which data is to be stored in sudden power loss (SPL), and thus the reliability of data storage apparatus may be improved.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Various embodiments of the present disclosure are described in detail with reference to the accompanying drawings. The drawings are schematic illustrations of various embodiments and intermediate structures. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present disclosure as defined in the appended claims.

The present teachings are described herein with reference to cross-section and/or plan illustrations of embodiments of the present disclosure. However, the embodiments of the present disclosure should not be construed as limiting the present teachings. Although a few embodiments of the present disclosure are shown and described, it will be appreciated by those of ordinary skill in the art that changes may be made in these embodiments without departing from the principles and spirit of the present teachings.

Figure 1:
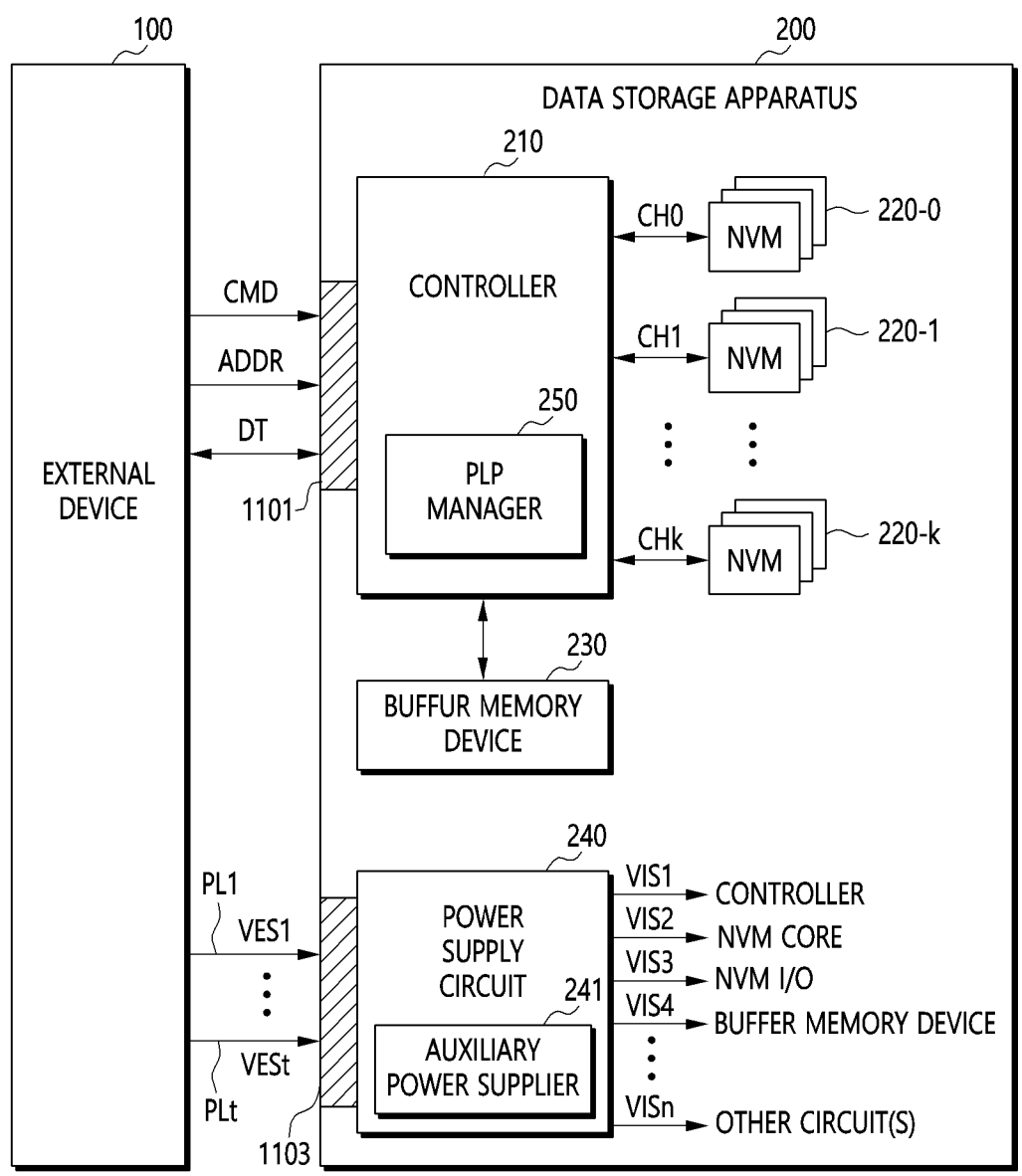
FIG. 1 is a diagram illustrating a configuration of a storage system according to an embodiment of the present disclosure.

Hereinafter, embodiments of the present disclosure will be described in more detail with reference to the accompanying drawings. FIG. 1 is a diagram illustrating a configuration of a storage system according to an embodiment of the present disclosure.

Referring to FIG. 1, a storage system 10 may include an external device 100 and a data storage apparatus 200.

The external device 100 may be a processing apparatus configured to control the data storage apparatus 200 to store data.

The data storage apparatus 200 may include a controller 210, nonvolatile memory devices 220-0 to 220-$k$, a buffer memory device 230, a power supply circuit 240, a signal connector 1101, and a power connector 1103.

The controller 210 may control the overall operation of the data storage apparatus 200.

The data storage apparatus 200 may receive a command signal CMD and an address signal ADDR from the external device 100 through the signal connector 1101 and transmit/receive data DT to/from the external device 100 through the signal connector 1101. The signal connector 1101 may be configured of various types of connectors according to an interfacing method between the external device 100 and the data storage apparatus 200.

The interfacing method between the external device 100 and the data storage apparatus 200 may include at least one of various communication interfaces or standards such as a universal serial bus (USB) protocol, a multimedia card (MMC) protocol, a peripheral component interconnection (PCI) protocol, a PCI-express (PCI-E) protocol, an advanced technology attachment (ATA) protocol, a serial advanced technology attachment (SATA) protocol, a parallel advanced technology attachment (PATA) protocol, a small computer system interface (SCSI) protocol, an enhanced small disk interface (ESDI) protocol, an integrated device electronics (IDE) protocol, a private protocol, a system management bus (SMBus) protocol, an inter-integrated circuit (I2C) protocol, and an improved inter-integrated circuit (I3C) protocol.

The controller 210 may analyze and process a signal received from the external device 100. The controller 210 may control operations of internal function blocks provided in the data storage apparatus 200 according to firmware or software for driving the data storage apparatus 200.

The buffer memory device 230 may temporarily store data to be stored in the nonvolatile memory devices 220-0 to 220-$k$. The buffer memory device 230 may temporarily store data read from the nonvolatile memory devices 220-0 to 220-$k$. The temporarily stored data in the buffer memory device 230 may be transmitted to the external device 100 or the nonvolatile memory devices 220-0 to 220-$k$ according to control of the controller 210.

The nonvolatile memory devices 220-0 to 220-$k$ may be used as storage media of the data storage apparatus 200. The nonvolatile memory devices 220-0 to 220-$k$ may be coupled with the controller 210 through a plurality of channels CH0 to CH$k$, respectively, where $k$ is a natural number. One or more nonvolatile memory devices may be coupled to a single channel. The nonvolatile memory devices coupled to the single channel may be coupled to the same signal bus and data bus.

The power supply circuit 240 may convert levels of external power voltages VES1 to VES$t$ input through the power connecter 1103 including a plurality of power lines PL1 to PL$t$ to generate a plurality of internal power voltages VIS1 to VIS$n$. The plurality of internal power voltages VIS1 to VIS$n$ generated in the power supply circuit 240 may be provided to the controller 210, the nonvolatile memory devices 220-0 to 220-$k$, the buffer memory device 230, and other circuits (not shown) of the data storage apparatus 200. The power supply circuit 240 may include an auxiliary power supplier 241. The auxiliary power supplier 241 may supply the internal power voltages VIS1 to VIS$n$ to allow the data storage apparatus 200 to be normally terminated when sudden power loss (SPL) is detected. The auxiliary power supplier 241 may include large capacity capacitors, but this is not limited thereto.

Although not shown in FIG. 1, the controller 210 may include various functional blocks, for example, internal circuits required to control data exchange between the external device 100 and the nonvolatile memory devices 220-0 to 220-$k$, such as a processor, an external interface, a working memory, an error correction code (ECC) circuit, a memory interface, and the like.

In particular, the controller 210 according to an embodiment of the present disclosure may include a PLP manger 250. In an embodiment, the PLP manager 250 may monitor a state (that is, health information) of a dump region included in each of the nonvolatile memory devices 220-0 to 220-$k$, and further monitor a power state of the auxiliary power supplier 241. Each of the nonvolatile memory devices 220-0 to 220-*k* may be configured of a plurality of memory blocks, and the dump region may include at least one memory block allocated to store buffered data which are flushed from the buffer memory device 230, when a SPL of the data storage apparatus 200 is detected. For example, the dump region may be configured to temporarily store data according to a state of power applied to the data storage apparatus 200. In this example, the health information of the dump region may include at least one among information about whether or not one or more bad memory blocks are included in the dump region, a number of the bad memory blocks, and locations of the bad memory blocks, and an erase/write count for the at least one memory block within the dump region, and the like.

The PLP manager 250 may generate environmental information corresponding to the PLP operation based on at least the health information of the dump region and share the environmental information of the dump region with the external device 100. In an embodiment, the environmental information may include information about whether or not the PLP operation can be performed. The environmental information may include information on a performance amount (range) of the PLP operation, and the performance amount of the PLP operation may be adaptively determined based on the health information.

The PLP manager 250 may generate the environmental information by reflecting the monitoring result of the power state of the auxiliary power supplier 241 in addition to the health information of the dump region.

The PLP manager 250 may share the environmental information with the external device 100 according to the request of the external device 100.

In an embodiment, the external device 100 may set control environmental information of the data storage apparatus 200 to protect data to be stored in the data storage apparatus 200. In this embodiment, the control environmental information may include information about whether or not the PLP operation can be performed. The control environmental information may include a unit data transmission amount corresponding to the data storage apparatus 200.

The external device 100 may request the environmental information corresponding to the PLP operation from the data storage apparatus 200. For example, the external device 100 may periodically request the environmental information from the data storage apparatus 200. The external device 100 may correct the control environmental information based on the environmental information received from the data storage apparatus 200.

In an embodiment, when information that the PLP operation is impracticable is included in the environmental information transmitted from the data storage apparatus 200 to the external device 100, the external device 100 may correct the control environmental information to include information that the data storage apparatus 200 cannot perform the PLP operation.

In an embodiment, when the information on the performance amount (range) of the PLP operation is included in the environmental information transmitted from the data storage apparatus 200 to the external device 100, the external device 100 may correct the control environmental information so that the unit data transmission amount corresponding to the data storage apparatus 200 is changed. The data storage apparatus 200 may add information that the performance amount (range) of the PLP operation is to be reduced to the environmental information, and transmit the environmental information including information for reduction in the performance amount (range) of the PLP operation to the external device 100, and the external device 100 may correct the control environmental information so that the unit data transmission amount is reduced in response to the reduction information of the performance amount (range).

Figure 2:
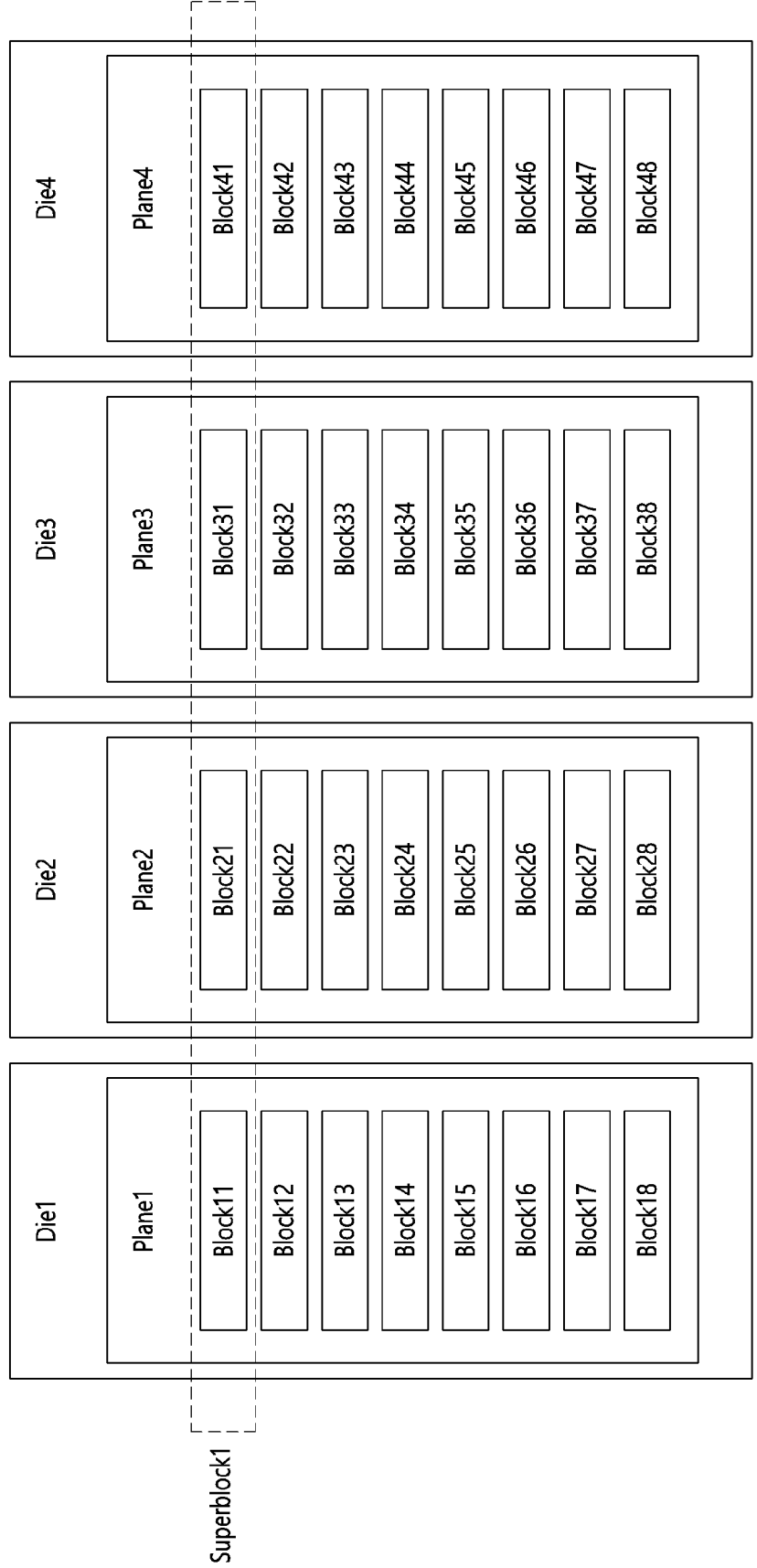
FIG. 2 is a diagram illustrating a nonvolatile memory device according to an embodiment of the present disclosure.

FIG. 2 is a diagram illustrating a configuration of a nonvolatile memory device according to an embodiment of the present disclosure.

Referring to FIG. 2, a nonvolatile memory device 220-*n* may include one or more memory dies Die1, Die2, Die3, and Die4. The memory dies Die1 to Die4 may include one or more planes Plane1, Plane2, Plane3, and Plane 4, respectively. FIG. 2 illustrates that each of the plurality of memory dies Die1 to Die4 may include a single plane Plane1, Plane2, Plane3, and Plane4.

The planes Plane1 to Plane4 may include a plurality of memory blocks Block11~Block18, Block21~Block28, Block31~block38, and Block41~Block48, respectively. Each of the plurality of memory blocks Block11~Block18, Block21~Block28, Block31~block38, and Block41~Block48 may include a plurality of pages (not shown), and each of the plurality of pages may include a plurality of memory cells (not shown) coupled to word lines.

The plurality of planes Plane1 to Plane4 may operate independently of each other. The controller 210 may logically couple memory blocks included in the plurality of planes Plane1 to Plane4 to constitute one super block to improve parallel processing performance of the data storage apparatus 200. FIG. 2 illustrates a first super block Superblock1 configured of a first-first memory block Block11, a second-first block Block2*t*, a third-first block Block3*t*, and a fourth-first block Block4*t* arranged in the plurality of planes Plane1, Plane2, Plane3, and Plane4, respectively.

The plurality of memory blocks Block11~Block18, Block21~Block28, Block31~block38, and Block41~Block48 may be divided into a plurality of regions including a first region and a second region. The first region may be a region configured to store user data transmitted/received to/from the external device 100. The second region may be the dump region including at least one memory block allocated to store buffered data, which are flushed from the buffer memory device 230, when sudden power loss (SPL) of the data storage 1*o* apparatus 200 is detected. For example, the second region may be a region configured to temporarily store data according to a state of the power applied to the data storage apparatus 200.

When the nonvolatile memory device 220-*n* operates in super block units, parallel access to the plurality of dies or the plurality of planes may be available, and thus the data read/write rate may be improved. However, as the nonvolatile memory device 200-*n* is repeatedly used, failure may occur in a memory block and a specific plane or die cannot be used. Accordingly, the nonvolatile memory device 220-*n* may not operate in super block units, and data processing may be delayed.

When a SPL is detected, the data storage apparatus 200 may have to perform the PLP operation which flashes the write data buffered in the buffer memory device 230 to the dump region within a time limit which is guaranteed by the auxiliary power supplier 241. However, when parallel processing of data cannot be performed due to deterioration in a health state of the dump region, for example, occurrence of the failed block in the dump region, the PLP operation may not be completed within the time limit.

The auxiliary power supplier 241 may be designed to have a charge capacity to which a margin is added for electrical energy required to flush the maximum amount (hereinafter, referred to as the maximally required dump amount) of data to be flushed in the PLP operation. This is because when the state of the dump block is deteriorated and thus the data cannot be written in parallel, the write speed may be reduced.

The PLP manager 250 according to an embodiment of the present disclosure may generate the environmental information that the data storage apparatus can complete the PLP operation within the time limit to guarantee data matching between the external device 100 and the data storage apparatus 200.

Figure 3:
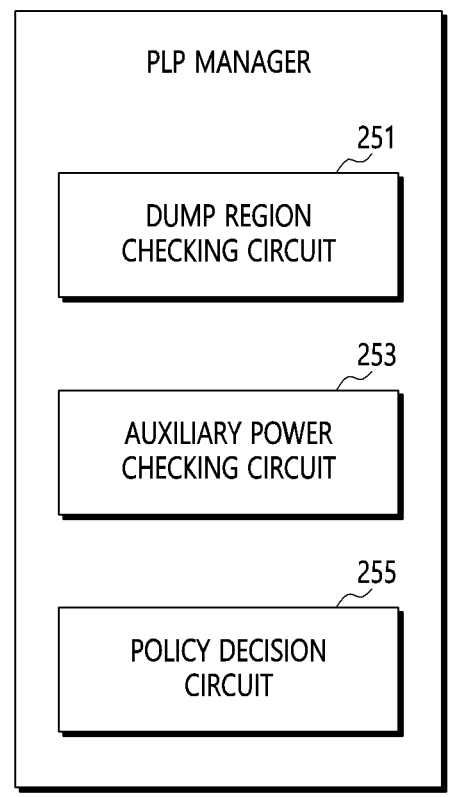
FIG. 3 is diagram illustrating a configuration of a power loss protection (PLP) manager according to an embodiment of the present disclosure.

FIG. 3 is a diagram illustrating a configuration of a PLP manager according to an embodiment of the present disclosure.

Referring to FIG. 3, the PLP manager 250 according to an embodiment may include a dump region checking circuit 251, an auxiliary power checking circuit 253, and a policy decision circuit 255.

The dump region checking circuit 251 may monitor states of memory blocks, which are allocated as the dump region among the plurality of memory blocks constituting the nonvolatile memory device 220-n, for example, the health information of the dump region. In an embodiment, the health information of the dump region may include at least one among information about whether or not one or more bad memory blocks are included in the dump region, a number of the bad memory blocks, and locations of the bad memory blocks, and an erase/write count for the at least one memory block within the dump region, and the like.

The dump region checking circuit 251 may calculate a dumpable amount per unit time based on the health information of the dump region. The dumpable amount per unit time may be calculated based on the health information of the dump region, the number of channels between the external device 100 and the data storage apparatus 200, a data transmission rate, a program rate of the nonvolatile memory device 220-n, and the like, but this is not limited thereto. The dump region checking circuit 251 may check the health information of the dump region in a boot-up operation of the data storage apparatus 200 or every set cycle during the operation of the data storage apparatus 200.

The auxiliary power checking circuit 253 may check a power state of the auxiliary power supplier 241, for example, an available power supply time through the auxiliary power supplier 241. The available power supply time may be a PLP time limit and may be measured based on the health states of the capacitors constituting the auxiliary power supplier 241, but this is not limited thereto. In an embodiment, the auxiliary power checking circuit 353 may check the power state of the auxiliary power supplier 241 in a boot-up operation of the data storage apparatus 200 or every set cycle during the operation of the data storage apparatus 200.

The policy decision circuit 255 may generate the environmental information based on at least the health information of the dump region and share the environmental information with the external device 100. In an embodiment, the environmental information may include information about whether or not the PLP operation is executable. The environmental information may include information on a performance amount (range) of the PLP operation, and the performance amount (range) of the PLP operation may be adaptively determined based on the health information. The policy decision circuit 255 may transmit the environmental information to the external device 100 according to a request of the external device 100, specifically, according to a periodic request of the external device 100.

In an embodiment, when the dumpable amount per unit time is less than a first threshold value TH1, the policy decision circuit 255 may add information that the PLP operation is impracticable to the environmental information and transmit the environmental information including the information that the PLP operation is impracticable to the external device 100. The first threshold value TH1 may be calculated as the maximally required dump amount over a PLP time limit, but this is not limited thereto. In an embodiment, the PLP time limit may be an initial PLP time limit determined according to an initial electrical energy capacity which is electrical energy capacity in design of the auxiliary power supplier 241. In another embodiment, the PLP time limit may be a real-time PLP time limit which is determined during a run-time by reflecting a power state of the auxiliary power supplier 241 which is a checking result of the auxiliary power checking circuit 253.

The maximally required dump amount may be determined according to capacity of the buffer memory device 230 and capacity of the dump region of the nonvolatile memory device 220-n.

First threshold value TH1=maximally required dump amount/PLP time limit [Equation 1]

To transmit the environmental information to the external device 100, the policy decision circuit 255 may transmit an asynchronous event request (AER) command to the external device 100. The AER command may be a command used to notify the external device 100 of a status, an error, and the health information of the data storage apparatus 200.

The external device 100 may receive the environmental information from the data storage apparatus 200 and correct the set control environmental information according to the received environmental information.

In an embodiment, when the information that the PLP operation is impracticable is included in the environmental information transmitted from the data storage apparatus 200 to the external device 100, the external device 100 may correct the control environmental information to include state information that the data storage apparatus 200 cannot perform the PLP operation. Further, the external device 100 may determine a data buffering mode corresponding to the state that the data storage apparatus 200 cannot perform the PLP operation as an operation mode and transmit a control signal (AER response signal) including the data buffering mode to the data storage apparatus 200.

The buffering mode determined through the external device 200 may be one of a normal mode, a write through mode, and a read only mode.

The normal mode may be a mode that the external device 100 may transmit a specific command, for example, a shutdown command to the data storage apparatus 200, the data storage apparatus 200 may flush the data from the buffer memory device 230 to the dump region of the nonvolatile memory device 220-n in response to the shutdown command and transmit a shutdown response signal indicating that the data flush is completed to the external device 100, and then the external device 100 may shut down power supply to the data storage apparatus 200.

The write through mode may be a mode that the data storage apparatus 200 may program write-requested data from the external device 100 in the nonvolatile memory device 220-n, and then transmit a write completion signal to the external device 100. When the write through mode is applied, the external device 100 may accurately determine whether or not the write-requested data is programmed.

The read only memory may be a mode that the external device 100 is only allowed to read data from the data storage apparatus 200.

In an embodiment, when the dumpable amount per unit time is greater than or equal to the first threshold value TH1 and is less than a second threshold value TH2, the policy decision circuit 255 may determine a performance amount (range) of the PLP operation based on the health information of the dump region and generate the environmental information including information on the determined performance amount (range) of the PLP operation. The second threshold value TH2 may be determined to be greater than the first threshold value TH1.

The performance amount (range) of the PLP operation may be an amount of the data to be buffered in the buffer memory device 230 and may be determined by considering the dumpable amount per unit time and the PLP time limit (initial PLP time limit or real-time PLP time limit). However, the method of determining the buffering amount is not limited thereto.

Buffering amount=dumpable amount per unit time*PLP time limit        [Equation 2]

The data storage apparatus 200 may restrict, up to the performance amount of the PLP operation, the amount of the data to be buffered in the buffer memory device 230 regardless of the unit data transmission amount transmitted from the external device 100.

In an embodiment, when the dumpable amount per unit time is greater than or equal to the first threshold value TH1 and less than the second threshold value 2, the policy decision circuit 255 may transmit the environmental information including information on the performance amount (range) of the PLP operation to the external device 100. In response to the environmental information transmitted from the policy decision circuit 255, the external device 100 may correct the control environmental information so that the unit data transmission amount corresponding to the data storage apparatus 200 is changed. For example, the data storage apparatus 200 may add the information that the performance amount (range) of the PLP operation is to be reduced, to the environmental information and transmit the environmental information including the information for reduction in the performance amount (range) of the PLP operation to the external device 100. In response to the environmental information transmitted from the data storage apparatus 200, the external device 100 may correct the control environmental information so that the unit data transmission amount is reduced.

In this way, the present technology may determine whether or not the PLP operation is executable and the performance amount (range) of the PLP operation, based on the dumpable amount per unit which is determined according to the health information of the dump region, and thus the data storage apparatus 200 and the external device 100 may consistently manage the data processing state.

Figure 4:
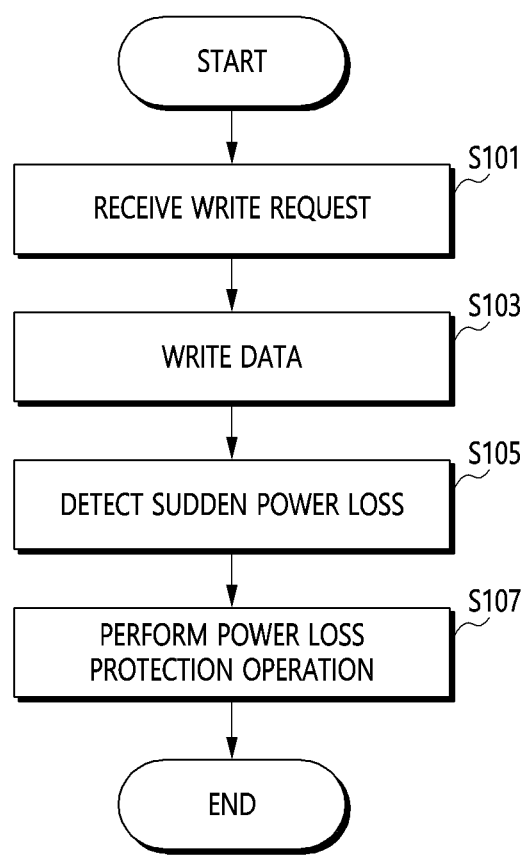
FIG. 4 is a flowchart describing a power loss protection (PLP) operation in sudden power loss (SPL) according to an embodiment of the present disclosure.

FIG. 4 is a flowchart describing a power loss protection (PLP) operation according to sudden power loss (SPL) according to an embodiment of the present disclosure.

The data storage apparatus 200 may receive a write request from the external device 100 (S101). The controller 210 may perform a data write operation according to the request of the external device 100 (S103).

When the SPL is detected during the data write operation (S105), the controller 210 may perform the PLP operation to retain the data to be written (S107).

The PLP operation may be an operation which flushes the write data temporarily stored in the buffer memory device 230 to the dump region of the nonvolatile memory region 200-n. When the power is supplied again, the data flushed in the dump region may be programmed in the first region, for example, the user data region of the nonvolatile memory region 200-n.

Figure 5:
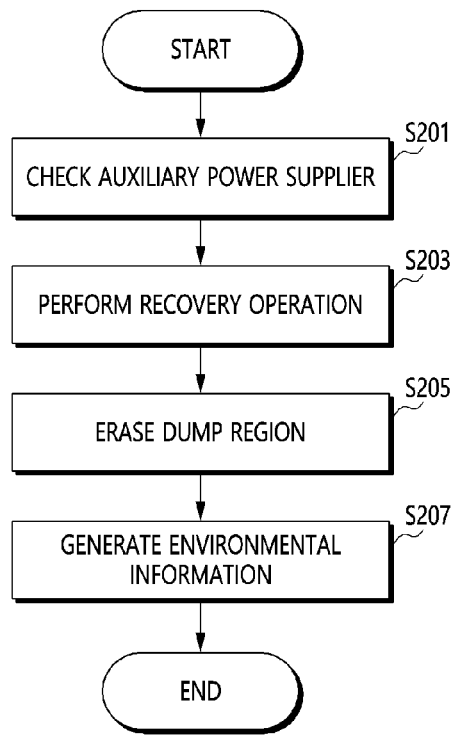
FIG. 5 is a flowchart describing a booting method of a data storage apparatus according to an embodiment of the present disclosure.

FIG. 5 is a flowchart describing a booting method of a data storage apparatus according to an embodiment of the present disclosure.

As the power is re-supplied after the SPL, the controller 210 may boot up the data storage apparatus 200. The booting operation may include an operation of checking the auxiliary power supplier 241 (S201), an operation of performing a recovery operation (S203), an operation of erasing a dump region (S205), and an operation of generating environmental information (S207).

In an embodiment, the recovery operation (S203) may include a map data recovery process, which finds an open block to be using in the SPL, searches for the latest access page, and generates a P2L list, and a user data recovery process which programs the data flushed in the dump region in the user data region.

The erase operation (S205) of erasing the dump region after the recovery operation (S203), may include checking at least one among the health information of the dump region, for example, information about whether or not one or more bad memory blocks are included in the dump region, a number of the bad memory blocks, and locations of the bad memory blocks, and an erase/write count for the at least one memory block within the dump region, and the like.

The controller 210 may generate the environmental information based on at least the state of the dump region (S207). The environmental information may include information about whether or not the PLP operation is executable and/or information for the performance amount (range) of the PLP operation. To generate the environmental information, the controller 210 may reflect a power state of the auxiliary power supplier 241 to the environmental information.

After the booting operation, the data storage apparatus 200 may standby in a usable state by the external device 100.

Figure 6:
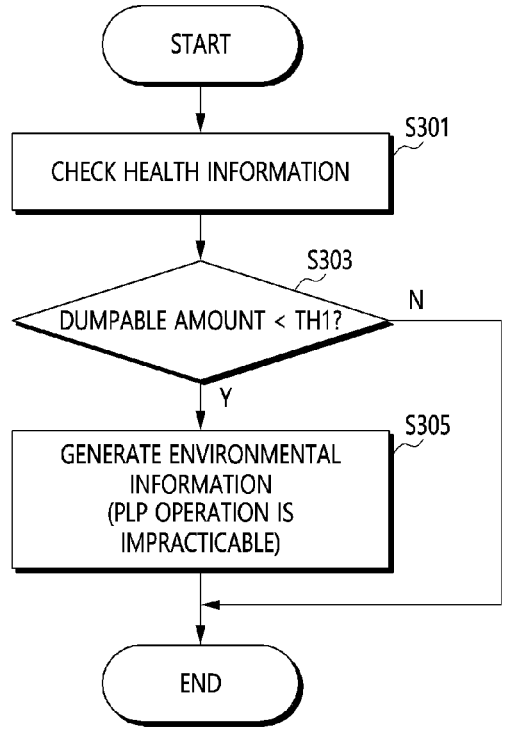
FIG. 6 is a flowchart describing an operating method of a data storage apparatus according to an embodiment of the present disclosure.

FIG. 6 is a flowchart describing an operating method of a data storage apparatus according to an embodiment of the present disclosure. FIG. 6 illustrates a method of generating environmental information which is applied to the PLP operation (S107 of FIG. 4) after the SPL detection. The environmental information may be generated, for example, in operation S207 of FIG. 5, but this is not limited thereto.

Referring to FIG. 6, the controller 210 may check the health information of the dump region in the booting process of the data storage apparatus 200 (S301)

The controller 210 may check whether or not the dumpable amount per unit time according to the health information of the dump region is less than the first threshold value TH1 (S303).

The dumpable amount per unit time may be calculated based on the health information of the dump region, the number of channels between the external device 100 and the data storage apparatus 200, a data transmission rate, a program rate of the nonvolatile memory device 220-n, and the like, but this is not limited thereto.

The first threshold value TH1 may be calculated as the maximally required dump amount over a PLP time limit, but this is not limited thereto. In an embodiment, the PLP time limit may be an initial PLP time limit determined according to an initial electrical energy capacity which is electrical energy capacity in design of the auxiliary power supplier

241. In another embodiment, the PLP time limit may be a real-time PLP time limit determined during a run-time by reflecting the power state of the auxiliary power supplier 241 which is the checking result of the auxiliary power checking circuit 253.

When the dumpable amount per unit time is less than the first threshold value TH1 (S303:Y), the controller 210 may add information that the PLP operation is impracticable to the environmental information and transmit, to the external device 100, the environmental information including the information that the PLP operation is impracticable (S305).

To transmit the environmental information to the external device 100, the controller 210 may use the AER command. When the environmental information is received from the data storage apparatus 200, the external device 100 may correct the preset control environmental information.

In an embodiment, when the information that the PLP operation is impracticable is included in the environmental information, the external device 100 may correct the control environmental information to include the state information that the data storage apparatus 200 cannot perform the PLP operation. Further, the external device 100 may determine a data buffering mode corresponding to the state that the data storage apparatus 200 cannot perform the PLP operation as an operation mode and transmit a control signal (AER response signal) including the data buffering mode to the data storage apparatus 200.

The data buffering mode determined through the external device 100 may be one of a normal mode, a write through mode, and a read only mode.

When the dumpable amount per unit time is greater than or equal to the first threshold value TH1 (S303:N), the controller 210 may not change the environmental information and then terminates the generation process of the environmental information.

Figure 7:
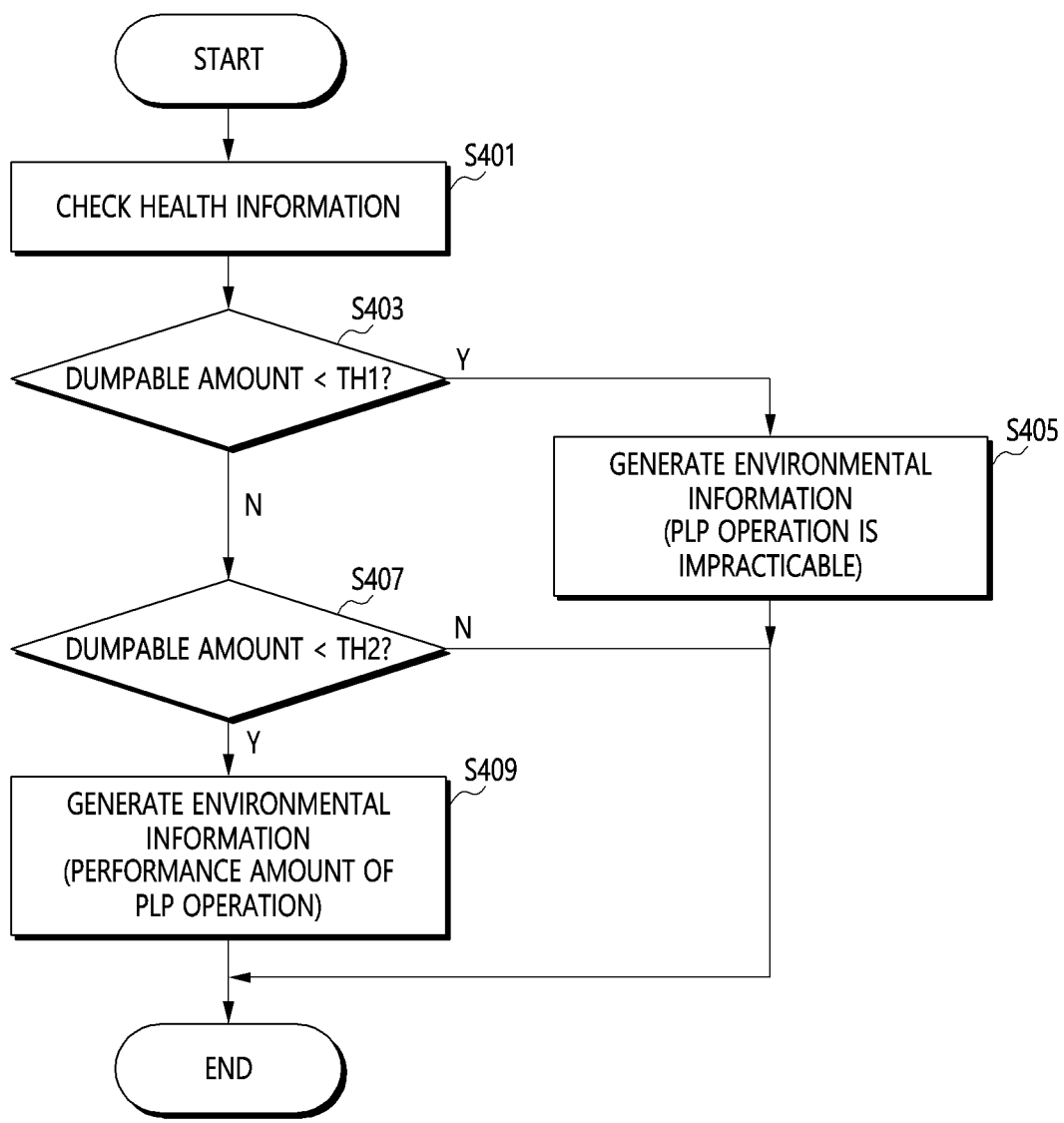
FIG. 7 is a flowchart describing an operating method of a data storage apparatus according to an embodiment of the present disclosure.

FIG. 7 is a flowchart describing an operating method of a data storage apparatus according to an embodiment of the present disclosure. FIG. 7 illustrates a method of generating environmental information which is applied to the PLP operation (S107 of FIG. 4) after the SPL detection. The environmental information may be generated, for example, operation S207 of FIG. 5, but this is not limited thereto.

Referring to FIG. 7, the controller 210 may check health information of the dump region in a booting process of the data storage apparatus 200 (S401).

The controller 210 may check whether or not the dumpable amount per unit time according to the health information of the dump region is less than the first threshold value TH1 (S403).

The dumpable amount per unit time may be calculated based on the health information of the dump region, the number of channels between the external device 100 and the data storage apparatus 200, a data transmission rate, a program rate of the nonvolatile memory device 220-$n$, and the like, but this is not limited thereto.

The first threshold value TH1 may be calculated as the maximally required dump amount over a PLP time limit, but this is not limited thereto. In an embodiment, the PLP time limit may be an initial PLP time limit determined according to an initial electrical energy capacity which is electrical energy capacity in design of the auxiliary power supplier 241. In another embodiment, the PLP time limit may be a real-time PLP time limit determined during a run-time by reflecting the power state of the auxiliary power supplier 241, for example, the checking result of the auxiliary power checking circuit 253.

When the dumpable amount per unit time is less than the first threshold value TH1 (S403:Y), the controller 210 may add information that the PLP operation is impracticable to the environmental information and transmit, to the external device 100, the environmental information including the information that the PLP operation is impracticable (S405).

To transmit the environmental information to the external device 100, the controller 210 may use the AER command. When the environmental information is received from the data storage apparatus 200, the external device 100 may correct the preset control environmental information.

In an embodiment, when the information that the PLP operation is impracticable is included in the environmental information, the external device 100 may correct the control environmental information to include state information that the data storage apparatus 200 cannot perform the PLP operation. Further, the external device 100 may determine the data buffering mode corresponding to the state that the data storage apparatus 200 cannot perform the PLP operation as the operation mode and transmit a control signal (AER response signal) including the data buffering mode to the data storage apparatus 200.

The data buffering mode determined through the external device 100 may be one of a normal mode, a write through mode, and a read only mode.

When the dumpable amount per unit time is greater than or equal to the first threshold value TH1 (S403:N), the controller 210 may check whether or not the dumpable amount per unit time is less than the second threshold value TH2 (S407). When the dumpable amount per unit time is less than the second threshold value TH2 (S407:Y), the controller 210 may determine the performance amount (range) of the PLP operation based on the health information of the dump region, and generate the environmental information including information on the determined performance amount (range) of the PLP operation (S409). The second threshold value TH2 may be determined to be greater than the first threshold value TH1.

The performance amount (range) of the PLP operation may be an amount of the data to be buffered in the buffer memory device 230 and may be determined by considering the dumpable amount per unit time and the PLP time limit (initial PLP time limit or real-time PLP time limit). For example, the performance amount (range) of the PLP operation may be determined as in Equation 2, but the method of determining the buffering data amount is not limited thereto.

The data storage apparatus 200 may restrict, up to the performance amount (range) of the PLP operation, the amount of data to be buffered in the buffer memory device 230 regardless of the unit data transmission amount transmitted from the external device 100.

The operation (S409) of generating the environmental information including information on the performance amount (range) of the PLP operation may further include a process of transmitting the environmental information to the external device 100.

As the environmental information is received from the data storage apparatus 200, the external device 100 may correct the control environmental information so that the unit data transmission amount corresponding to the data storage apparatus 200 is changed. For example, the data storage apparatus 200 may add information that the performance amount (range) of the PLP operation is to be reduced to the environmental information and transmit the environmental information including the information for reduction in the performance amount (range) of the PLP operation to the external device 100. The external device 100 may correct the control environmental information so that the unit data transmission amount is reduced in response to the information for reduction in the performance amount (range).

When the dumpable amount per unit time is greater than or equal to the second threshold value TH2 (S407:N), the controller 210 may terminate the generation process of the environmental information.

As described above, the present technology may determine whether or not to the PLP operation is executable and the performance amount (range) of the PLP operation based on the dumpable amount per unit, which is determined according to the health information of the dump region, in a SPL and thus the external device 200 and the external device 100 may consistently manage the data processing state.

The above-described embodiments of the present disclosure are intended to illustrate and not to limit the present invention. Various alternatives and equivalents are possible. The invention is not limited by the embodiments described herein. Nor is the invention limited to any specific type of semiconductor device. Other additions, subtractions, or modifications which are apparent in view of the present disclosure are intended to fall within the scope of the appended claims. Furthermore, the embodiments may be combined to form additional embodiments.

What is claimed is:

1. A data storage apparatus comprising:
   a nonvolatile memory device including a dump region configured to temporarily store data in response to a state of power applied thereto; and
   a controller configured to:
   monitor health information of the dump region,
   generate environmental information corresponding to a power loss protection (PLP) operation based on the health information, and
   share the environmental information with an external device.

2. The data storage apparatus of claim 1,
   wherein the dump region includes at least one memory block, and
   wherein the health information includes at least one of information about whether one or more bad memory blocks are included in the dump region, a number of the bad memory blocks, locations of the bad memory blocks, and an erase/write count for the at least one memory block within the dump region.

3. The data storage apparatus of claim 1, wherein the environmental information includes information about whether the PLP operation is executable.

4. The data storage apparatus of claim 1, wherein the environmental information includes information on a performance amount of the PLP operation.

5. The data storage apparatus of claim 1,
   further comprising an auxiliary power supplier configured to supply power to the data storage apparatus when sudden power loss (SPL) is detected,
   wherein the controller is further configured to monitor a power state of the auxiliary power supplier, and
   wherein the controller generates the environmental information further based on the power state of the auxiliary power supplier.

6. The data storage apparatus of claim 1, wherein the controller shares the environmental information with the external device according to a request of the external device.

7. The data storage apparatus of claim 1,
   wherein the controller generates the environmental information by calculating a dumpable amount per unit time based on the health information, and
   wherein the environmental information includes, when the dumpable amount per unit time is less than a first threshold value, information that the PLP operation is impracticable.

8. The data storage apparatus of claim 1, wherein the controller shares the environmental information with the external device through an asynchronous event request (AER) command.

9. The data storage apparatus of claim 1, wherein the controller is further configured to receive, from the external device and as a response to the sharing, a control signal including one buffering mode among a normal mode, a write through mode, and a read only mode.

10. The data storage apparatus of claim 9,
    wherein the normal mode is a mode in which the controller flushes data from a buffer memory device to the dump region and transmits a flush completion signal to the external device,
    wherein the write through mode is a mode in which the controller programs write-requested data in the nonvolatile memory device and transmits a write completion signal to the external device, and
    wherein the read only mode is a mode in which the external device is only allowed to read data from the data storage apparatus.

11. The data storage apparatus of claim 1,
    further comprising a buffer memory device configured to temporarily store data transmitted from the external device,
    wherein the controller generates the environmental information by calculating a dumpable amount per unit time based on the health information,
    wherein the environmental information includes information on a performance amount of the PLP operation when the dump available amount per unit time is greater than or equal to a first threshold value and less than a second threshold value, and
    wherein the controller is further configured to restrict, up to the performance amount, an amount of data to be temporarily stored in the buffer memory device.

12. An operating method of a data storage apparatus including a nonvolatile memory device, a buffer memory device and a controller, the method comprising:
    temporarily storing, by the controller, write-requested data in the buffer memory device in response to a write request from an external device;
    flushing, by the controller and when sudden power loss (SPL) is detected while processing the write request, the temporarily stored data from the buffer memory device to a dump region of the nonvolatile memory device;
    monitoring, by the controller, health information of the dump region;
    generating, by the controller, environmental information corresponding to a power loss protection (PLP) operation based on the health information; and
    sharing, by the controller, the environmental information with the external device.

13. The method of claim 12, wherein the health information includes at least one of information about whether one or more bad memory blocks are included in the dump region, a number of the bad memory blocks, locations of the bad memory blocks and an erase/write count for the at least one memory block within the dump region.

14. The method of claim 12, wherein the environmental information includes information about whether the PLP operation is executable and information on a performance amount of the PLP operation.

15. The method of claim 12, wherein the environmental information is generated further based on a power state of an auxiliary power supplier configured to supply power to the data storage apparatus when the SPL is detected.

16. The method of claim 12,
wherein the generating of the environmental information includes calculating a dumpable amount per unit time based on the health information, and
wherein the environmental information includes, when the dumpable amount per unit time is less than a first threshold value, information that the PLP operation is impracticable.

17. A storage system comprising:
a data storage apparatus; and
a processing apparatus coupled to the data storage apparatus through an interface apparatus and configured to control the data storage apparatus to store data,
wherein the processing apparatus is further configured to:
set control environmental information of the data storage apparatus to protect the stored data,
request, from the data storage apparatus, environmental information corresponding to a power loss protection (PLP) operation of the data storage apparatus, and
correct the control environmental information based on the environmental information received from the data storage apparatus.

18. The storage system of claim 17,
wherein the control environmental information includes information about whether the PLP operation is executable, and
wherein the processing apparatus corrects, when the environmental information includes information that the PLP operation is impractical, the control environmental information to include state information that the data storage apparatus cannot perform the PLP operation.

19. The storage system of claim 17,
wherein the control environmental information includes information on a unit data transmission amount corresponding to the data storage apparatus,
wherein the environmental information includes information on a performance amount of the PLP operation, and
wherein the processing apparatus corrects, based on the environmental information, the control environmental information so that the unit data transmission amount is changed.

20. The storage system of claim 19, wherein the processing apparatus corrects, when the environmental information includes information that the performance amount is to be reduced, the control environmental information so that the unit data transmission amount is reduced.

* * * * *